United States Patent
Kakadjian et al.

(10) Patent No.: US 8,841,240 B2
(45) Date of Patent: Sep. 23, 2014

(54) ENHANCING DRAG REDUCTION PROPERTIES OF SLICK WATER SYSTEMS

(75) Inventors: Sarkis R. Kakadjian, San Antonio, TX (US); Frank Zamora, George West, TX (US); Ronald Powell, Humble, TX (US); Erin Fitzgerald, San Antonio, TX (US)

(73) Assignee: Clearwater International, LLC, Houston, TX (US)

( * ) Notice: Subject to any disclaimer, the term of this patent is extended or adjusted under 35 U.S.C. 154(b) by 811 days.

(21) Appl. No.: 13/052,947

(22) Filed: Mar. 21, 2011

(65) Prior Publication Data

US 2012/0245061 A1    Sep. 27, 2012

(51) Int. Cl.
*C09K 8/62* (2006.01)
*C09K 8/70* (2006.01)
*C09K 8/68* (2006.01)

(52) U.S. Cl.
CPC ... *C09K 8/62* (2013.01); *C09K 8/70* (2013.01); *C09K 2208/28* (2013.01); *C09K 8/68* (2013.01)
USPC ........................................ 507/240; 166/305.1

(58) Field of Classification Search
None
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 260/72 |
| 2,805,958 A | 7/1959 | Bueche et al. | 106/308 |
| 3,059,909 A | 10/1962 | Wise | 261/39.3 |
| 3,163,219 A | 12/1964 | Wyant et al. | 166/283 |
| 3,301,723 A | 1/1967 | Chrisp | 149/20 |
| 3,301,848 A | 1/1967 | Halleck | 536/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,318,835 A * | 3/1982 | Clarke | 264/36.16 |
| 4,378,845 A | 4/1983 | Medlin et al. | 166/297 |
| 4,461,716 A | 7/1984 | Barbarin et al. | 252/307 |

(Continued)

OTHER PUBLICATIONS

U.S. Appl. No. 13/117,304, filed May 27, 2011, Falana et al.

(Continued)

*Primary Examiner* — Alicia Bland
(74) *Attorney, Agent, or Firm* — Robert W Strozier (57) ABSTRACT

Novel slick water fracturing fluid compositions are disclosed, where the compositions including with slick water fracturing compositions including a partially hydrolyzed polyacrylamide polymer system within invert emulsion and an effective amount of a friction reducer booster system, where the effective amount is sufficient to reduce a drag friction of the composition by an additional amount of at least 5% in the first 30 seconds of evaluation in high salinity and low temperature environments.

27 Claims, 5 Drawing Sheets

(56) References Cited

U.S. PATENT DOCUMENTS

| | | | | |
|---|---|---|---|---|
| 4,479,041 | A | 10/1984 | Fenwick et al. | 200/81 R |
| 4,506,734 | A | 3/1985 | Nolte | 166/308.1 |
| 4,514,309 | A | 4/1985 | Wadhwa | 507/211 |
| 4,541,935 | A | 9/1985 | Constien et al. | 507/225 |
| 4,549,608 | A | 10/1985 | Stowe et al. | 166/280.1 |
| 4,561,985 | A | 12/1985 | Glass, Jr. | 507/108 |
| 4,623,021 | A | 11/1986 | Stowe | 166/250.1 |
| 4,654,266 | A | 3/1987 | Kachnik | 428/403 |
| 4,657,081 | A | 4/1987 | Hodge | 166/380.5 |
| 4,660,643 | A | 4/1987 | Perkins | 166/283 |
| 4,683,068 | A | 7/1987 | Kucera | 507/201 |
| 4,686,052 | A | 8/1987 | Baranet et al. | 507/244 |
| 4,695,389 | A | 9/1987 | Kubala | 507/244 |
| 4,705,113 | A | 11/1987 | Perkins | 166/302 |
| 4,714,115 | A | 12/1987 | Uhri | 166/308.1 |
| 4,718,490 | A | 1/1988 | Uhri | 166/281 |
| 4,724,905 | A | 2/1988 | Uhri | 166/250.1 |
| 4,725,372 | A | 2/1988 | Teot et al. | 507/129 |
| 4,739,834 | A | 4/1988 | Peiffer et al. | 166/308.4 |
| 4,741,401 | A | 5/1988 | Walles et al. | 166/300 |
| 4,748,011 | A | 5/1988 | Baize | 423/228 |
| 4,779,680 | A | 10/1988 | Sydansk | 166/300 |
| 4,795,574 | A | 1/1989 | Syrinek et al. | 507/238 |
| 4,817,717 | A | 4/1989 | Jennings, Jr. et al. | 166/278 |
| 4,830,106 | A | 5/1989 | Uhri | 166/250.1 |
| 4,846,277 | A | 7/1989 | Khalil et al. | 166/280.1 |
| 4,848,468 | A | 7/1989 | Hazlett et al. | 166/300 |
| 4,852,650 | A | 8/1989 | Jennings, Jr. et al. | 166/250.1 |
| 4,869,322 | A | 9/1989 | Vogt, Jr. et al. | 166/280.1 |
| 4,892,147 | A | 1/1990 | Jennings, Jr. et al. | 166/280.2 |
| 4,926,940 | A | 5/1990 | Stromswold | 166/247 |
| 4,938,286 | A | 7/1990 | Jennings, Jr. | 166/280.1 |
| 4,978,512 | A | 12/1990 | Dillon | 423/226 |
| 5,005,645 | A | 4/1991 | Jennings, Jr. et al. | 166/280.1 |
| 5,024,276 | A | 6/1991 | Borchardt | 166/308.6 |
| 5,067,556 | A | 11/1991 | Fudono et al. | 62/196.4 |
| 5,074,359 | A | 12/1991 | Schmidt | 166/280.1 |
| 5,074,991 | A | 12/1991 | Weers | 208/236 |
| 5,082,579 | A | 1/1992 | Dawson | 507/211 |
| 5,106,518 | A | 4/1992 | Cooney et al. | 507/21 |
| 5,110,486 | A | 5/1992 | Manalastas et al. | 507/260 |
| 5,169,411 | A | 12/1992 | Weers | 44/421 |
| 5,224,546 | A | 7/1993 | Smith et al. | 166/300 |
| 5,228,510 | A | 7/1993 | Jennings, Jr. et al. | 166/263 |
| 5,246,073 | A | 9/1993 | Sandiford et al. | 166/295 |
| 5,259,455 | A | 11/1993 | Nimerick et al. | 166/308.5 |
| 5,330,005 | A | 7/1994 | Card et al. | 166/280.2 |
| 5,342,530 | A | 8/1994 | Aften et al. | 252/8.551 |
| 5,347,004 | A | 9/1994 | Rivers et al. | 544/180 |
| 5,363,919 | A | 11/1994 | Jennings, Jr. | 166/308.1 |
| 5,402,846 | A | 4/1995 | Jennings, Jr. et al. | 166/259 |
| 5,411,091 | A | 5/1995 | Jennings, Jr. | 166/280.1 |
| 5,424,284 | A | 6/1995 | Patel et al. | 507/129 |
| 5,439,055 | A | 8/1995 | Card et al. | 166/280.2 |
| 5,462,721 | A | 10/1995 | Pounds et al. | 423/226 |
| 5,465,792 | A | 11/1995 | Dawson et al. | 166/295 |
| 5,472,049 | A | 12/1995 | Chaffe et al. | 166/250.1 |
| 5,482,116 | A | 1/1996 | El-Rabaa et al. | 166/250.1 |
| 5,488,083 | A | 1/1996 | Kinsey, III et al. | 507/211 |
| 5,497,831 | A | 3/1996 | Hainey et al. | 166/308.1 |
| 5,501,275 | A | 3/1996 | Card et al. | 166/280.2 |
| 5,551,516 | A | 9/1996 | Norman et al. | 166/308.2 |
| 5,624,886 | A | 4/1997 | Dawson et al. | 507/217 |
| 5,635,458 | A | 6/1997 | Lee et al. | 507/240 |
| 5,649,596 | A | 7/1997 | Jones et al. | 166/300 |
| 5,669,447 | A | 9/1997 | Walker et al. | 166/300 |
| 5,674,377 | A | 10/1997 | Sullivan, III et al. | 208/208 R |
| 5,688,478 | A | 11/1997 | Pounds et al. | 423/228 |
| 5,693,837 | A | 12/1997 | Smith et al. | 556/148 |
| 5,711,396 | A | 1/1998 | Joerg et al. | 180/444 |
| 5,722,490 | A | 3/1998 | Ebinger | 166/281 |
| 5,744,024 | A | 4/1998 | Sullivan, III et al. | 208/236 |
| 5,755,286 | A | 5/1998 | Ebinger | 166/281 |
| 5,775,425 | A | 7/1998 | Weaver et al. | 166/276 |
| 5,787,986 | A | 8/1998 | Weaver et al. | 166/280.2 |
| 5,806,597 | A | 9/1998 | Tjon-Joe-Pin et al. | 166/300 |
| 5,807,812 | A | 9/1998 | Smith et al. | 507/238 |
| 5,833,000 | A | 11/1998 | Weaver et al. | 166/276 |
| 5,853,048 | A | 12/1998 | Weaver et al. | 166/279 |
| 5,871,049 | A | 2/1999 | Weaver et al. | 166/276 |
| 5,877,127 | A | 3/1999 | Card et al. | 507/273 |
| 5,908,073 | A | 6/1999 | Nguyen et al. | 166/276 |
| 5,908,814 | A | 6/1999 | Patel et al. | 507/131 |
| 5,964,295 | A | 10/1999 | Brown et al. | 166/308.2 |
| 5,979,557 | A | 11/1999 | Card et al. | 166/300 |
| 5,980,845 | A | 11/1999 | Cherry | 423/229 |
| 6,016,871 | A | 1/2000 | Burts, Jr. | 166/300 |
| 6,035,936 | A | 3/2000 | Whalen | 166/308.5 |
| 6,047,772 | A | 4/2000 | Weaver et al. | 166/276 |
| 6,054,417 | A | 4/2000 | Graham et al. | 507/238 |
| 6,059,034 | A | 5/2000 | Rickards et al. | 166/280.2 |
| 6,060,436 | A | 5/2000 | Snyder et al. | 507/266 |
| 6,069,118 | A | 5/2000 | Hinkel et al. | 507/277 |
| 6,123,394 | A | 9/2000 | Jeffrey | 299/16 |
| 6,133,205 | A | 10/2000 | Jones | 507/276 |
| 6,147,034 | A | 11/2000 | Jones et al. | 507/238 |
| 6,162,449 | A | 12/2000 | Maier et al. | 424/401 |
| 6,162,766 | A | 12/2000 | Muir et al. | 507/267 |
| 6,169,058 | B1 | 1/2001 | Le et al. | 507/222 |
| 6,228,812 | B1 | 5/2001 | Dawson et al. | 507/221 |
| 6,247,543 | B1 | 6/2001 | Patel et al. | 175/64 |
| 6,267,938 | B1 | 7/2001 | Warrender et al. | 423/226 |
| 6,283,212 | B1 | 9/2001 | Hinkel et al. | 166/279 |
| 6,291,405 | B1 | 9/2001 | Lee et al. | 507/136 |
| 6,330,916 | B1 | 12/2001 | Rickards et al. | 166/280.2 |
| 6,435,277 | B1* | 8/2002 | Qu et al. | 166/281 |
| 6,725,931 | B2 | 4/2004 | Nguyen et al. | 166/280.2 |
| 6,756,345 | B2 | 6/2004 | Pakulski et al. | 507/246 |
| 6,793,018 | B2 | 9/2004 | Dawson et al. | 166/300 |
| 6,832,650 | B2 | 12/2004 | Nguyen et al. | 166/279 |
| 6,875,728 | B2 | 4/2005 | Gupta et al. | 507/240 |
| 7,140,433 | B2 | 11/2006 | Gatlin et al. | 166/250.1 |
| 7,268,100 | B2 | 9/2007 | Kippie et al. | 507/244 |
| 7,350,579 | B2 | 4/2008 | Gatlin et al. | 166/308.3 |
| 7,392,847 | B2 | 7/2008 | Gatlin et al. | 166/280.2 |
| 7,517,447 | B2 | 4/2009 | Gatlin | 208/236 |
| 7,565,933 | B2 | 7/2009 | Kippie et al. | 166/372 |
| 7,566,686 | B2 | 7/2009 | Kippie et al. | 507/213 |
| 7,712,534 | B2* | 5/2010 | Bryant et al. | 166/305.1 |
| 7,712,535 | B2 | 5/2010 | Venditto et al. | 166/308.2 |
| 7,767,628 | B2 | 8/2010 | Kippie et al. | 507/102 |
| 7,829,510 | B2 | 11/2010 | Gatlin et al. | 507/277 |
| 7,846,878 | B2* | 12/2010 | Robb et al. | 507/224 |
| 7,886,824 | B2 | 2/2011 | Kakadjian et al. | 166/308.2 |
| 7,915,203 | B2 | 3/2011 | Falana et al. | 507/136 |
| 7,932,214 | B2 | 4/2011 | Zamora et al. | 507/202 |
| 7,942,201 | B2 | 5/2011 | Ekstrand et al. | 133/246 |
| 7,956,017 | B2 | 6/2011 | Gatlin et al. | 166/280.2 |
| 7,956,217 | B2 | 6/2011 | Falana et al. | 562/572 |
| 7,971,659 | B2 | 7/2011 | Gatlin et al. | 510/492 |
| 7,989,404 | B2 | 8/2011 | Kakadjian et al. | 507/261 |
| 7,992,653 | B2 | 8/2011 | Zamora et al. | 175/65 |
| 8,011,431 | B2 | 9/2011 | van Petegen | 166/270 |
| 8,012,913 | B2 | 9/2011 | Gatlin et al. | 507/239 |
| 8,028,755 | B2 | 10/2011 | Darnell et al. | 166/379 |
| 8,034,750 | B2 | 10/2011 | Thompson et al. | 507/273 |
| 8,065,905 | B2 | 11/2011 | Sweeney et al. | 73/49.1 |
| 8,084,401 | B2 | 12/2011 | Lukocs et al. | 507/238 |
| 8,093,431 | B2 | 1/2012 | Falana et al. | 564/471 |
| 8,097,567 | B2 | 1/2012 | Wilson, Jr. | 507/131 |
| 8,099,997 | B2 | 1/2012 | Curr et al. | 73/49.5 |
| 8,141,661 | B2 | 3/2012 | Kakadjian et al. | 175/69 |
| 8,158,562 | B2 | 4/2012 | Wilson, Jr. et al. | 507/203 |
| 8,172,952 | B2 | 5/2012 | Wanner et al. | 134/22.11 |
| 2002/0049256 | A1 | 4/2002 | Bergeron, Jr. | 514/674 |
| 2002/0165308 | A1 | 11/2002 | Kinniard et al. | 524/492 |
| 2003/0220204 | A1 | 11/2003 | Baran, Jr. et al. | 507/200 |
| 2005/0045330 | A1 | 3/2005 | Nguyen et al. | 166/281 |
| 2005/0092489 | A1 | 5/2005 | Welton et al. | 166/280.2 |
| 2005/0137114 | A1 | 6/2005 | Gatlin et al. | 510/424 |
| 2006/0194700 | A1 | 8/2006 | Gatlin et al. | 507/203 |
| 2008/0251252 | A1 | 10/2008 | Schwartz | 507/238 |
| 2008/0318812 | A1 | 12/2008 | Kakadjian, Sr. et al. | 507/219 |
| 2009/0250659 | A1 | 10/2009 | Gatlin | 208/236 |

(56) References Cited

U.S. PATENT DOCUMENTS

| | | |
|---|---|---|
| 2009/0275488 A1 | 11/2009 | Zamora et al. ............... 507/236 |
| 2010/0077938 A1 | 4/2010 | Zamora et al. ............... 106/677 |
| 2010/0190666 A1* | 7/2010 | Ali et al. ..................... 507/235 |
| 2010/0212905 A1 | 8/2010 | van Petegen ................ 507/236 |
| 2010/0252262 A1 | 10/2010 | Ekstrand et al. ........... 166/305.1 |
| 2010/0292108 A1 | 11/2010 | Kakadjian ................... 507/229 |
| 2010/0305010 A1 | 12/2010 | Falana et al. ................ 507/274 |
| 2010/0311620 A1 | 12/2010 | Kakadjian et al. ........... 507/266 |
| 2011/0001083 A1 | 1/2011 | Falana et al. ................ 252/178 |
| 2011/0005756 A1 | 1/2011 | Kakadjian et al. ........... 507/236 |
| 2011/0240131 A1 | 10/2011 | Parker ............................ 137/13 |
| 2011/0247821 A1 | 10/2011 | Thompson et al. ........... 507/267 |
| 2011/0284247 A1 | 11/2011 | Zamora et al. ................ 166/295 |
| 2011/0284248 A1 | 11/2011 | Zamora et al. ................ 166/295 |
| 2012/0071366 A1 | 3/2012 | Falana et al. ................ 507/202 |
| 2012/0071367 A1 | 3/2012 | Falana et al. ................ 507/203 |
| 2012/0071370 A1 | 3/2012 | Falana et al. ................ 507/233 |
| 2012/0073813 A1 | 3/2012 | Zamora et al. ............... 166/285 |
| 2012/0137752 A1 | 6/2012 | Morrow ......................... 73/49.5 |

OTHER PUBLICATIONS

U.S. Appl. No. 13/247,985, filed Sep. 29, 2011, Veldman et al.
U.S. Appl. No. 13/109,712, filed May 17, 2011, Falana et al.
U.S. Appl. No. 13/102,053, filed May 6, 2011, Falana et al.
U.S. Appl. No. 13/094,806, filed Apr. 16, 2011, Zamora et al.
U.S. Appl. No. 13/348,267, filed Jan. 11, 2012, Kakadjian et al.
U.S. Appl. No. 13/249,819, filed Sep. 30, 2011, Falana et al.
U.S. Appl. No. 13/348,279, filed Jan. 11, 2012, Falana et al.

* cited by examiner

ENHANCING DRAG REDUCTION PROPERTIES OF SLICK WATER SYSTEMS

BACKGROUND OF THE INVENTION

1. Field of the Invention

Embodiments of the present invention relate to slick water fracturing compositions including a partially hydrolyzed polyacrylamide polymer system within an inverted emulsion and an effective amount of a friction reducer booster system, where the effective amount is sufficient to reduce a drag friction of the composition by an amount greater than about 50% in the first 30 seconds of evaluation in high salinity and low temperature environments.

Embodiments of the present invention provide slick water fracturing compositions including water, a partially hydrolyzed polyacrylamide polymer and an effective amount of a friction reducer booster system including a quaternary salt or a plurality of quaternary salts, where the effective amount is sufficient to reduce a drag friction of the composition by an additional 12% or more in high salinity and low temperature environments compared to the tests in the absence of the friction reducer booster system.

2. Description of the Related Art

Historically, improving drag reduction in slick water systems has been addressed by decreasing the concentration of total dissolved solids by cutting the produced brine with fresh water in ratios that can go up to 10:1 (fresh water to produced water).

Another way to address the problem has been manufacturing a more salt resistance friction reducers, where the composition includes terpolymers of acrylamide, hydrolyzed acrylamide and partially sulfonated acrylamide.

A more recent approach includes changing the emulsion package of the inverted emulsion or containing the partially hydrolyzed Polyacrylamide.

While these approaches have had some success, there is still a need in the art for slick water systems having improved drag reduction properties.

SUMMARY OF THE INVENTION

Embodiments of the present invention provide slick water fracturing compositions including a partially hydrolyzed polyacrylamide polymer system within invert emulsion and an effective amount of a friction reducer booster system, where the effective amount is sufficient to reduce a drag friction of the composition by an additional amount of about 5% in the first 30 seconds of evaluation in high salinity and low temperature environments. In certain embodiments, the drag friction is reduced by an additional amount of about 5% in the first 30 seconds of evaluation in high salinity and low temperature environments. In other embodiments, the drag friction is reduced by an additional amount of about 10% in the first 30 seconds of evaluation in high salinity and low temperature environments. In other embodiments, the drag friction is reduced by an additional amount of about 12% in the first 30 seconds of evaluation in high salinity and low temperature environments.

Embodiments of the present invention provide slick water fracturing compositions including, water, a partially hydrolyzed polyacrylamide polymer and an effective amount of a friction reducer booster system of quaternary salt or a plurality of quaternary salts, where the effective amount is sufficient to reduce a drag friction of the composition by an additional 5%, 10% or 12% or more in the first 30 seconds of evaluation in high salinity and low temperature environments compared to the tests in the absence of the friction reducer booster system.

Embodiments of the present invention provide methods for fracturing a formation including pumping a fracturing fluid into a formation at a pressure sufficient to fracture the formation, water as base fluid, 0.25-1.5 gal/1000 gal of friction reducer based in a inverted emulsion with 25 wt. % and about 35 wt. % of partially hydrolyzed polyacrylamide polymers and an effective friction reducer booster, where the effective amount is sufficient to reduce a drag friction of the composition by an additional about 5% or more in the first 30 seconds of evaluation compared to the fluid without the friction reducer booster. In other embodiments, the additional drag reduction is about 10% in the first 30 seconds of evaluation. In other embodiments, the additional drag reduction is about 12% in the first 30 seconds of evaluation.

Embodiments of the present invention provide methods for fracturing a formation including pumping a fracturing fluid into a formation at a pressure sufficient to fracture the formation, where the fluid including between about 0.25 and about 1.5 gal/1000 gal of invert emulsion with about 25 to about 35 wt. % of partially hydrolyzed polyacrylamide polymers and an effective amount of friction reducer booster, where the effective amount is sufficient to reduce a drag friction of the composition up to additional 5% in the first 30 seconds of evaluation compared to the fluid without the booster. In other embodiments, the additional drag reduction is about 10% in the first 30 seconds of evaluation. In other embodiments, the additional drag reduction is about 12% in the first 30 seconds of evaluation.

Embodiments of the present invention provide a slick water fracturing composition comprising from about 0.01 to about 2.5 gpt of an inverted emulsion including between about 25 wt. % and about 35 wt. % of a partially hydrolyzed polyacrylamide polymer system and an effective amount of a friction reducing booster system, where the effective amount is sufficient to reduce a drag friction of the composition by an additional 5% or more in the first 30 seconds of evaluation in high salinity aqueous solutions and/or temperature environments compared to the tests in the absence of the friction reducer booster system. In other embodiments, the additional drag reduction is about 10% in the first 30 seconds of evaluation. In other embodiments, the additional drag reduction is about 12% in the first 30 seconds of evaluation.

BRIEF DESCRIPTION OF THE DRAWINGS

The invention can be better understood with reference to the following detailed description together with the appended illustrative drawings in which like elements are numbered the same.

DEFINITIONS OF THE INVENTION

The term "gpt" means gallons per thousand gallons.
The term "gptg" means gallons per thousand gallons.
The term "pptg" means pounds per thousand gallons.
The term "wt. %" means weight percent.
The term "w/w" means weight per weight.
The term "amphoteric" refers to surfactants that have both positive and negative charges. The net charge of the surfactant can be positive, negative, or neutral, depending on the pH of the solution.
The term "anionic" means a compound that possesses a net negative charge.
The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use otherwise conventional techniques known in the art.
The term "proppant" refers to a granular substance suspended in the fracturing fluid during the fracturing operation, which serves to keep the formation from closing back down upon itself once the pressure is released. Proppants envisioned by the present invention include, but are not limited to, conventional proppants familiar to those skilled in the art such as sand, 20-40 mesh sand, resin-coated sand, sintered bauxite, glass beads, and similar materials.
The term "surfactant" refers to a soluble, or partially soluble compound that reduces the surface tension of liquids, or reduces inter-facial tension between two liquids, or a liquid and a solid by congregating and orienting itself at these interfaces.

DETAILED DESCRIPTION OF THE INVENTION

The inventors have found that drag properties and/or friction properties of slick water fracturing systems, using friction reducers based in inverted emulsions of high molecular weight of partially hydrolyzed polyacrylamide polymers can be reduced to 65% in 30 seconds or less in brines from water flowback, whose high concentration of total dissolved solids is higher than 100,000 mg/L using a friction reduction booster system of this invention. The inventors have found that by adding a friction reduction booster system at low concentrations to slick water fracturing fluids including base water and a partially hydrolyzed polyacrylamide polymer, the friction/drag properties of the fluids can be significantly increased. The friction reduction booster system comprises one quaternary salt or a plurality of quaternary salts. The addition of the friction reduction booster systems of the invention enhances a rate of inversion of the inverted emulsion of the friction reducer and therefore the rate of hydration of the polymer(s). The inventors have found that the friction reducer booster systems of this invention cause high friction reduction of slick water systems without the need to use expensive terpolymers, which contains acrylamido-methyl-propane sulfonate (AMPS) segments. The inventors have also found that by adding the friction reducer booster system of this invention to a slick water fracturing fluid, the friction reducer booster system enhances friction reduction properties of the fluid allowing the use of less friction reducer to achieve desired fracturing properties. The inventors have found that the friction reducer booster systems of this invention are well suited for use in high salinity brines and low temperature environments.

It has been observed and reported that quaternary salt based biocides have a detrimental effect on friction reducers. SPE 119569: Are You Buying Too Much Friction Reducer Because of Your Biocide? Shawn M. Rimassa, Paul R. Howard, and Michael O. Arnold, S P E, Schlumberger.

In the present invention, the inventors have shown that quaternary salts found in that Bio-Clear 242D had synergistic effect with anionic friction reducers such as WFR-62LA "aka" FRA-405 in high salinity environment such as Apt. 110,000 ppm TDS. The inventors tested Bio-Clear™ 242D and two of the three quaternary salts in Bio-Clear™ 242D in high salinity environments. The two quaternary salts tested herein were Alkyl (C12-16) Dimethylbenzylammonium chloride available from Sigma Aldrich and sold under the name SigmaClean™ and 1-Octaminium, N,N-Dimethyl-N-Octyl-Chloride from Lonza sole under the name Bardac™ LF. The inventors also tested several other quaternary salt compositions as friction reducer boosters, all of this showed significant friction reduction when used in combination with anionic friction reducers in slick water using friction reducers based in partially hydrolyzed Polyacrylamide™ (PHPA) delivered within an inverted emulsion.

Suitable Reagents and Devices

Suitable friction reducer booster systems of this invention include, without limitation, (1) compounds of the general formula $R^1R^2R^3ArN+X^-$, where $R^1$ and $R^2$ are carbyl group including 1 to 3 carbon atoms, $R^3$ is a carbyl group including about 8 to about 20 carbon atoms, Ar is an aryl group and $X^-$ is a counterion, (2) compounds of the general formula $R^1R^2R^3R^4N+X^-$, where R1 and R2 are carbyl group including 1 to 3 carbon atoms, $R^3$ and $R^4$ are a carbyl group including about 6 to about 10 carbon atoms, and $X^-$ is a counterion or (3) mixtures and combinations thereof, where $X^-$ includes chloride ($Cl^-$), bromide ($Br^-$), hydroxide ($OH^-$), or mixtures thereof.

In certain embodiments, the quaternary friction reduction systems of this invention include, without limitation, (1) compounds of the general formula $R^1R^2R^3ArN+X^-$, where $R^1$ and $R^2$ are carbyl group including 1 to 2 carbon atoms, $R^3$ is a carbyl group including about 10 to about 18 carbon atoms, Ar is an aryl group and $X^-$ is a chloride, (2) compounds of the general formula $R^1R^2R^3R^4N+X^-$, where $R^1$ and $R^2$ are carbyl group including 1 to 2 carbon atoms, $R^3$ and $R^4$ are a carbyl group including about 7 to about 9 carbon atoms, and $X^-$ is a chloride, or (3) mixtures and combinations thereof.

In certain embodiments, the compound of the general formula $R^1R^2R^3ArN+X^-$ comprises alkyl (C12-16), dimethylbenzylammonium chloride.

In certain embodiments, the friction reducer booster systems of this invention include, without limitation, (1) compounds of the general formula $R^1R^2R^3ArN+X^-$, where $R^1$ and $R^2$ are carbyl group including 1 carbon atom, $R^3$ is a carbyl group including about 12 to about 16 carbon atoms, Ar is an aryl group and $X^-$ is a chloride, (2) compounds of the general formula $R^1R^2R^3R^4N+X^-$, where $R^1$ and $R^2$ are carbyl groups including 1 carbon atom, $R^3$ and $R^4$ are a carbyl group including 8 carbon atoms, and $X^-$ is a chloride, or (3) mixtures and combinations thereof.

In certain embodiments, the compound of the general formula $R^1R^2R^3ArN+X^-$ comprises alkyl (C12-16), dimethylbenzylammonium chloride.

In certain embodiments the compound of the general formula $R^1R^2R^3R^4N+X^-$ comprises 1-Octaminium, N,N-Dimethyl-N-Octyl-Chloride.

Suitable partially hydrolyzed polyacrylamide polymers for use in this invention include, without limitation, polyacrylamide polymers having a molecular weight between about 1 million and about 50 million and being partially hydrolyzed, where the degree of hydrolysis is between about 1% to about 50%.

In certain embodiments, the partially hydrolyzed polyacrylamide polymers include polyacrylamide polymers having a molecular weight between about 5 million and about 40 million and being partially hydrolyzed, where the degree of hydrolysis is between about 1% to about 50%.

In certain embodiments, the partially hydrolyzed polyacrylamide polymers include, without limitation, polyacrylamide polymers having a molecular weight between about 10 million and about 30 million and being partially hydrolyzed, where the degree of hydrolysis is between about 1% to about 50%.

In certain embodiments, the partially hydrolyzed polyacrylamide polymers include, without limitation, polyacrylamide polymers having a molecular weight between about 20 million and about 30 million and being partially hydrolyzed, where the degree of hydrolysis is between about 1% to about 50%.

Fracturing Fluids

Generally, a slick water fracturing treatment involves pumping a high viscosity fluid into a formation including a proppant, although the proppant may be pumped-in later, as a free viscous fluid, or pad, usually water with some fluid additives to generate high viscosity, into a formation at a rate faster than the fluid can escape into the formation so that the pressure rises and the rock of the formation fractures or breaks, creating artificial fractures and/or enlarging existing fractures. During or after fracturing the formation, the propping agent, generally a solid material such as sand is added to the fluid to form a slurry that is pumped into the newly formed fractures in the formation to prevent them from closing when the pumping pressure is released. The proppant transport ability of a base fluid depends on the type of viscosifying additives added to the water base.

"Waterfrac treatments employ the use of low cost, low viscosity fluids in order to stimulate very low permeability reservoirs. The results have been reported to be successful (measured productivity and economics) and rely on the mechanisms of asperity creation (rock spalling), shear displacement of rock and localized high concentration of proppant to create adequate conductivity. It is the last of the three mechanisms that is mostly responsible for the conductivity obtained in "waterfrac" treatments. The mechanism can be described as analogous to a wedge splitting wood.

There are various methods available for breaking a fracturing fluid or a treating fluid. Typically, fluids break after the passage of time and/or prolonged exposure to high temperatures. However, it is desirable to be able to predict and control the breaking within relatively narrow limits. Mild oxidizing agents are useful as breakers when a fluid is used in a relatively high temperature formation, although formation temperatures of 300° F. (149° C.) or higher will generally break the fluid relatively quickly without the aid of an oxidizing agent.

Examples of inorganic breaking agents for use in this invention include, but are not limited to, persulfates, percarbonates, perborates, peroxides, perphosphates, permanganates, etc. Specific examples of inorganic breaking agents include, but are not limited to, alkaline earth metal persulfates, alkaline earth metal percarbonates, alkaline earth metal perborates, alkaline earth metal peroxides, alkaline earth metal perphosphates, zinc salts of peroxide, perphosphate, perborate, and percarbonate, and so on. Additional suitable breaking agents are disclosed in U.S. Pat. Nos. 5,877,127; 5,649,596; 5,669,447; 5,624,886; 5,106,518; 6,162,766; and 5,807,812. In some embodiments, an inorganic breaking agent is selected from alkaline earth metal or transition metal-based oxidizing agents, such as magnesium peroxides, zinc peroxides, and calcium peroxides.

The liquid carrier can generally be any liquid carrier suitable for use in oil and gas producing wells. A presently preferred liquid carrier is water. The liquid carrier can comprise water, can consist essentially of water, or can consist of water. Water will typically be a major component by weight of the fluid. The water can be potable or non-potable water. The water can be brackish or contain other materials typical of sources of water found in or near oil fields. For example, it is possible to use fresh water, brine, or even water to which any salt, such as an alkali metal or alkali earth metal salt ($NaCO_3$, NaCl, KCl, etc.) has been added.

EXPERIMENTS OF THE INVENTION

Determination of the Friction Reduction of the Slick Water Systems

Prepare 12 liters of the slick water base system (with no added polymer). Pour the 12 liters of the base system into a feed tank of a friction loop system and start to shear the base system at a rate of 9 gal/min and determine the drop of pressure across the friction loop system. Add 0.5 gpt or 1 gpt of the polymer system and note the drop pressure at 0.5, 1.0, 1.5, 2.0 and 3.0 minutes. Determine at each time the percentage of friction reduction as function of the pressure drop, where the Friction Reduction (%)=$[1-(DP/DP_0)]*100$, where $DP_0$ represents the original pressure drop and DP the pressure drop when the formulation include the breaker system under study.

Example 1

This example illustrates the use of Bio-Clean™ 242D, referred to as FR1, in a slick water inverted fracturing fluid including 0.5 gpt of WFR-55LA including partially hydrolyzed polyacrylamide polymers, available from Clearwater International, LLC, with or without 0.5 gpt FR1.

Figure 1:
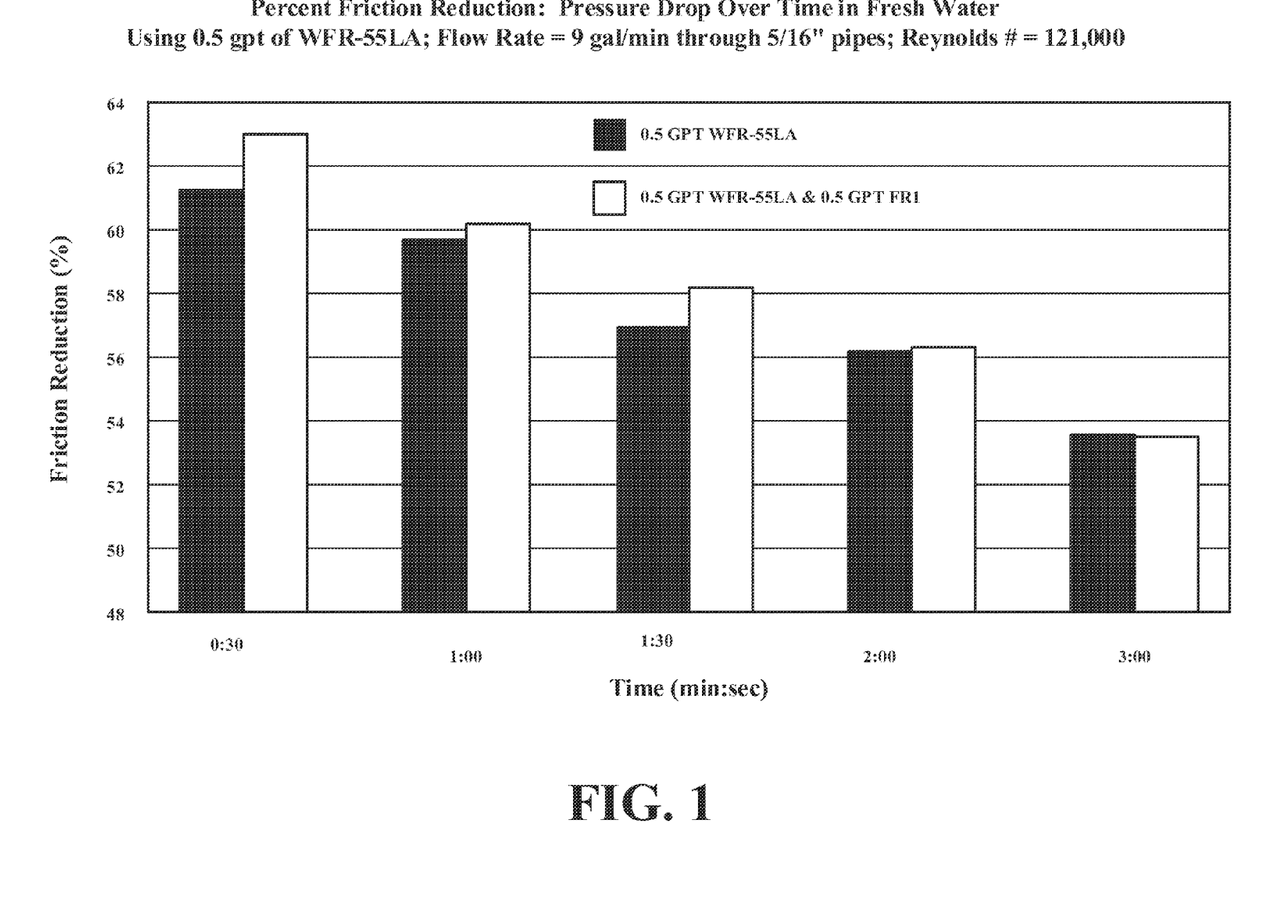
FIG. 1 depicts a plot of friction reduction of an embodiment of a first slick water fracturing fluid made with fresh water using 0.5 gpt of friction reducers WFR-55LA and 0.5 gpt of a first friction reducer booster system.

The two fluids were tested as described above. The results are set forth in FIG. 1, where the second fracturing fluid shows slightly enhanced friction reduction over the time period, except for the last time measurement, where the two fluids are essentially equally effective.

Example 2

This example illustrates the use of Bio-Clear™ 242D, referred to as FR1, in a slick water inverted fracturing fluid including 1.0 gpt of WFR-62LA (partially hydrolyzed polyacrylamide polymer system within invert emulsion), available from Clearwater International, LLC, with or without 0.5 gpt FR1.

1.0 gpt WFR-62LA was added to form a first fracturing fluid. To the same slick water fluid was added 0.5 gpt of FR1 to form a second fracturing fluid.

Figure 2:
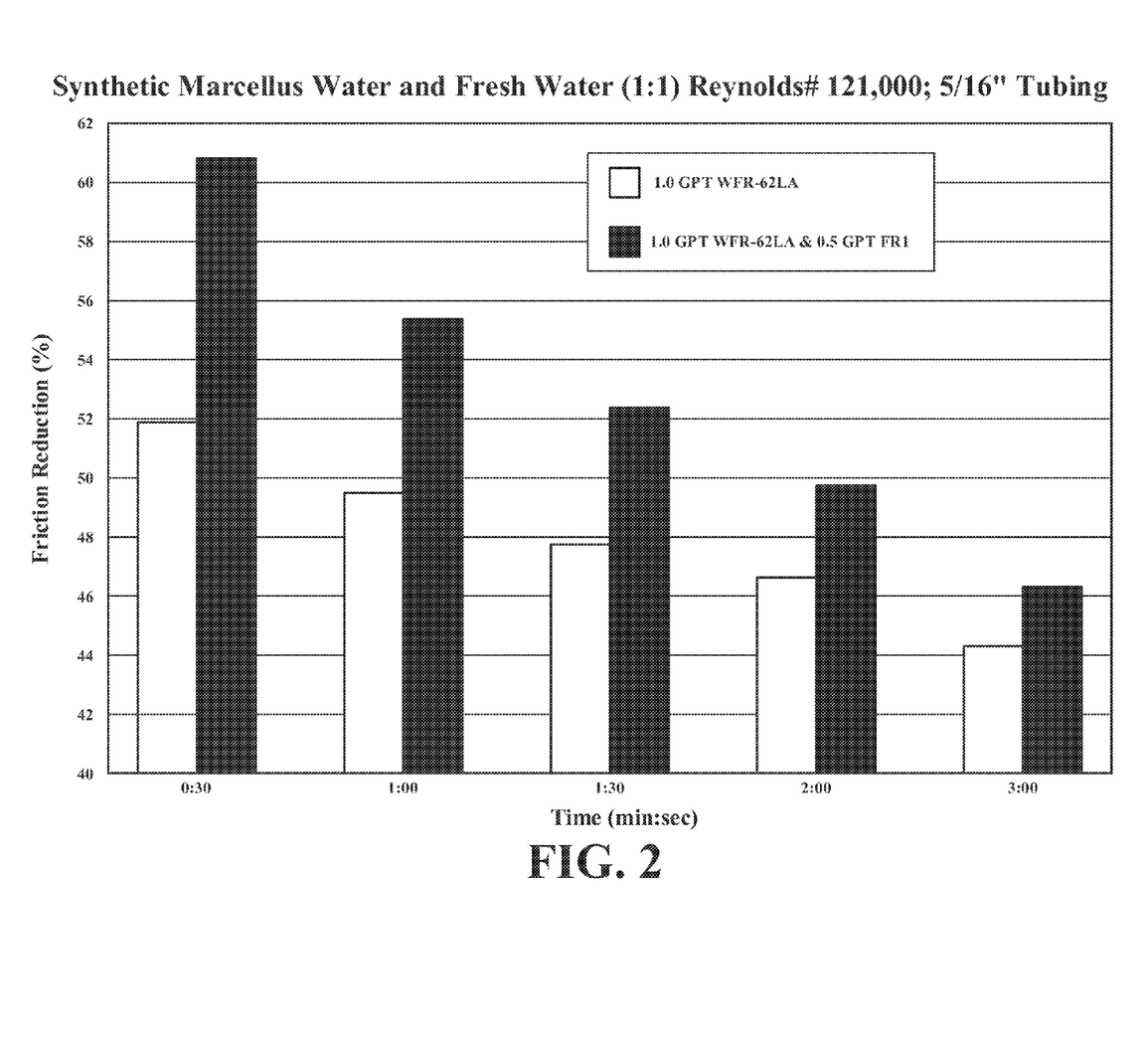
FIG. 2 depicts a plot of friction reduction of an embodiment of a second slick water fracturing fluid made with Synthetic Water simulating 1:1 ratio (fresh water:Marcellus flow back sample) with total dissolved solids (TDS) of 109,282 mg/L of this invention using 0.5 gpt of friction reducer WFR-62LA and 0.5 gpt of a first friction reducer booster system.

The two fluids were tested as described above. The results are set forth in FIG. 2, where the second fracturing fluid shows enhanced friction reduction over the entire time frame compared to the first fracturing fluid.

Example 3

This example illustrates the use of SigmaClean™, referred to as FR2, in a slick water fluid including 0.5 gpt of WFR-55LA (partially hydrolyzed polyacrylamide polymer system within inverted emulsion), available from Clearwater International, LLC, or 0.5 gpt of WFR-62LA (partially hydrolyzed polyacrylamide polymer system within an inverted emulstion, available from Clearwater International, LLC, with or without 0.075 gpt FR2.

To a slick water inverted fracturing fluid was added 0.5 gpt of WFR-55LA or 0.5 gpt WFR-62LA to form fracturing fluids without the friction reduction system. To the these slick water inverted fracturing fluids were added 0.075 gpt of FR2 to form fracturing fluids with the friction reduction system.

Figure 3:
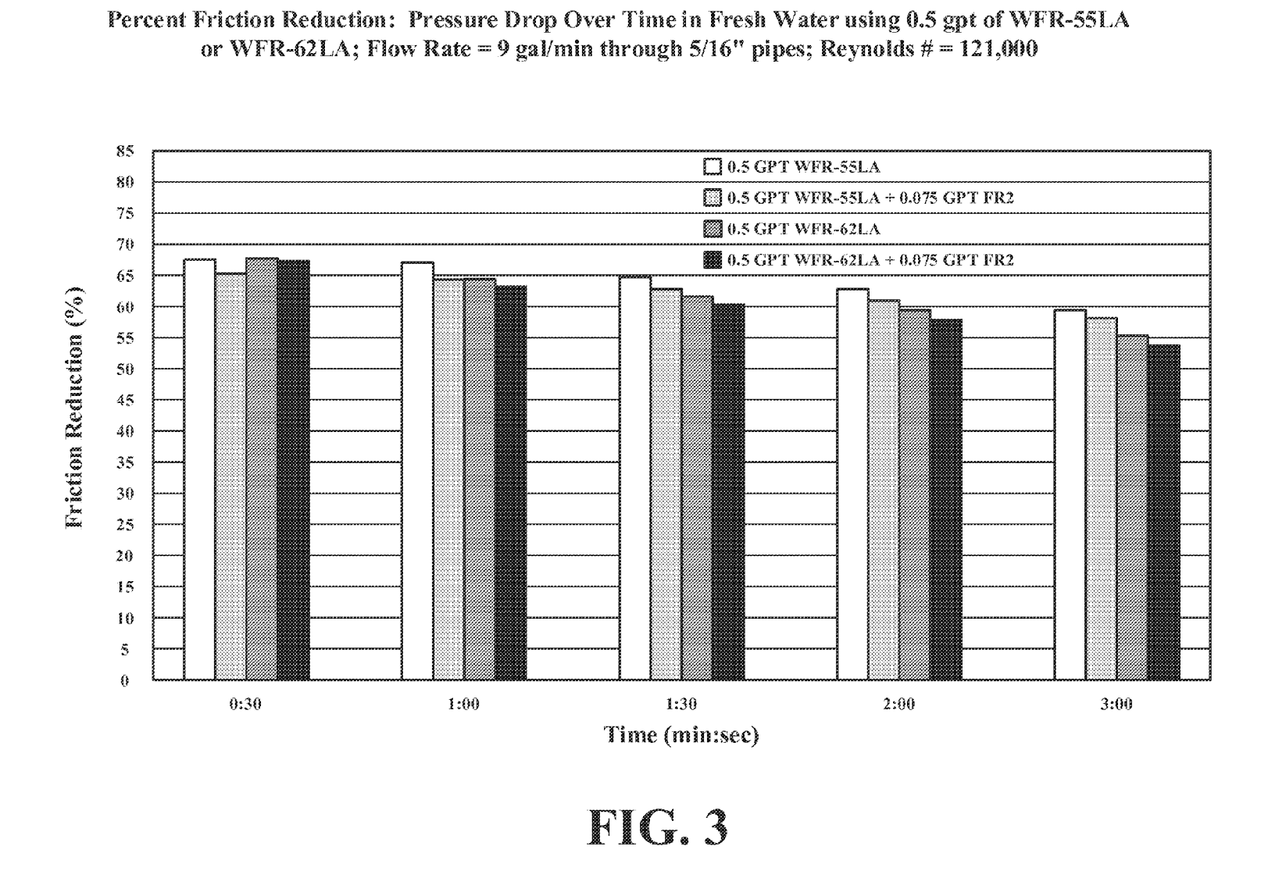
FIG. 3 depicts a plot of friction reduction of the first and second slick water fracturing fluids of this invention with 0.5 gpt of friction reducer WFR-55LA and 0.5 gpt of friction reducer WFR-62LA and using 0.075 gpt of a second friction reducer booster system.

The fluids were tested as described above. The results are set forth in FIG. 3, where the fracturing fluids, with are all fresh water systems, show that the system with or without the friction reduction systems of this invention behave substantially the same.

Example 4

This example illustrates the use of SigmaClean™, BarDac™ LF and A-1458, referred to as FR2, FR3 and FR4 respectively, in a slick water inverted fracturing fluid including 1.0 gpt of WFR-62LA (partially hydrolyzed polyacrylamide polymer system within an inverted emulsion), available from Clearwater International, LLC, with or without 0.15 gpt gluteraldehyde, 0.0375 gpt FR2, 0.075 gpt FR2, 0.15 gpt FR2, 0.15 gpt FR3, 0.0375 gpt FR4 and 0.15 gpt FR4. A-1458 is comprises about 77.0% w/w of benzyl-C12-16-alkyldimethylammonium chloride in a mixed solvent including water, isopropyl alcohol (IPA) and methanol.

To a slick water inverted fracturing fluid was added 1.0 gpt WFR-62LA to form a no FR fracturing fluid. To the same slick water inverted fracturing fluid was added 0.15 gpt gluteraldehyde, 0.0375 gpt FR2, 0.075 gpt FR2, 0.15 gpt FR2, 0.15 gpt FR3, 0.0375 gpt FR4 and 0.15 gpt FR4 to form the other fluids.

Figure 4:
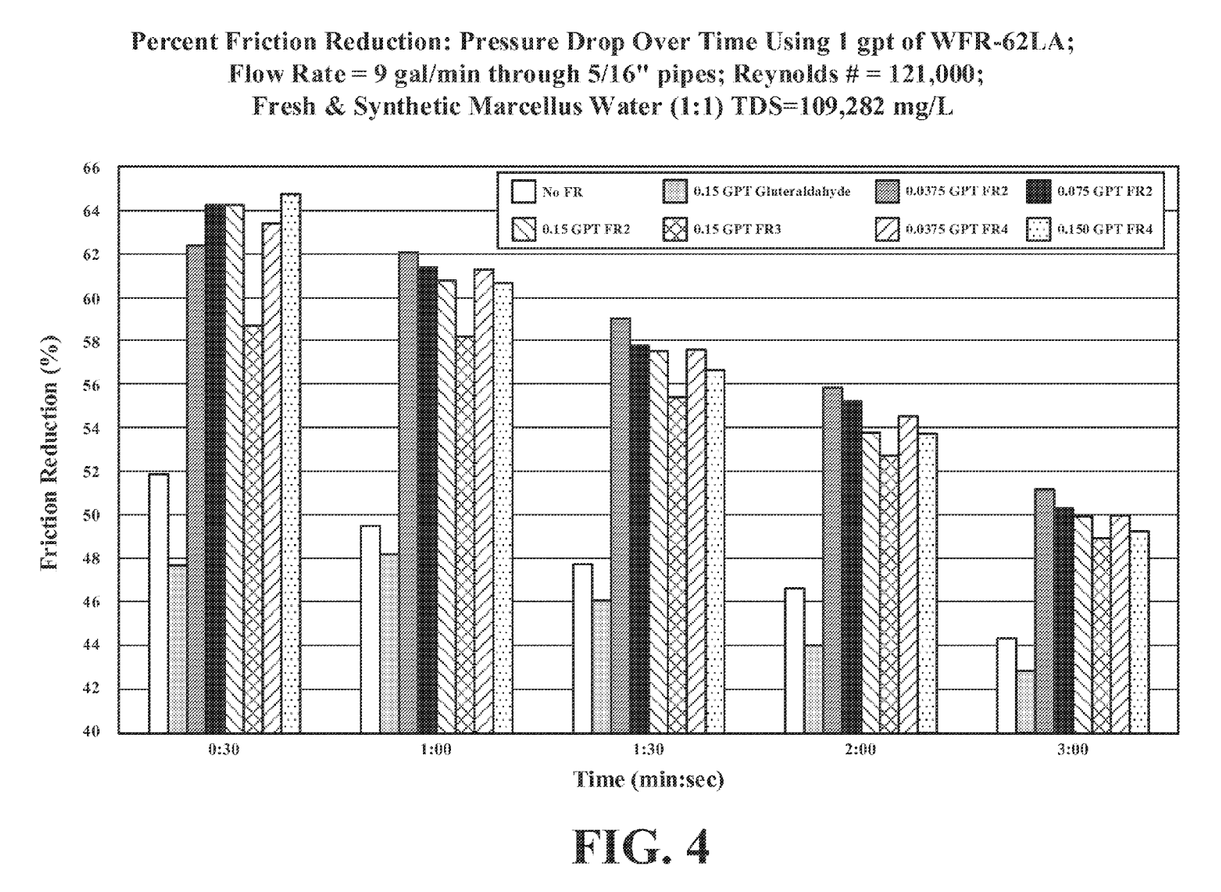
FIG. 4 depicts a plot of friction reduction of the slick water fracturing fluid using 0.5 gpt of WFR-62LA made with Synthetic Water simulating 1:1 ratio (fresh water:Marcellus flow back sample) with total dissolved solids (TDS) of 109,282 mg/L and using three different friction reducer booster systems of this invention at different concentrations.

The fluids were tested as described above. The results are set forth in FIG. 4, where the fluids including FR2, FR3 and FR4 showed significant increases friction reduction compared to the blank fluid and the fluid including 0.15 gpt gluteraldehyde—a conventional biocide.

Example 5

This example illustrates the use of SigmaClean, referred to as FR2, in a slick water inverted fracturing fluid including 1.0 gpt of WFR-55LA (partially hydrolyzed polyacrylamide polymer system within an inverted emulsion), available from Clearwater International, LLC, with or without 0.15 gpt FR2.

To a slick water inverted fracturing fluid was added 1.0 gpt WFR-55LA to form a first fracturing fluid. To the same slick water inverted fracturing fluid was added 1.0 gpt WFR-55LA and 0.15 gpt of FR2 to form a second fracturing fluid.

Figure 5:
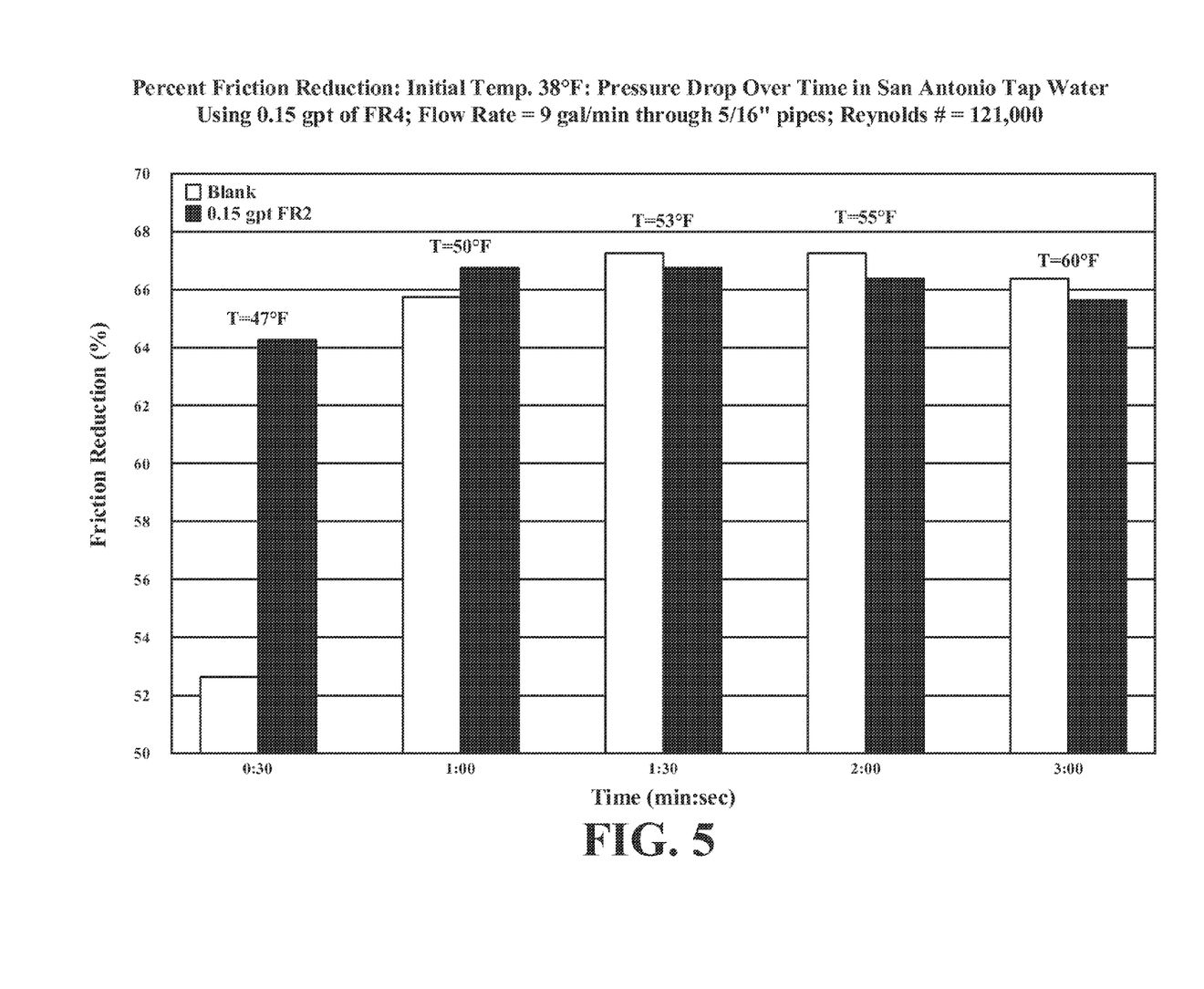
FIG. 5 depicts a plot of friction reduction of the first slick water fracturing fluid at low temperature using 0.5 gpt of friction reducer WFR-55LA and 0.15 gpt friction reducer booster system FR4 of this invention as several different temperatures.

The two fluids were tested as described above. The results are set forth in FIG. 5, where the second fracturing fluid shows enhanced friction reduction at low temperature and both were essentially equally effective at higher temperature.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for fracturing a formation comprising:
pumping a slick water fracturing composition into a formation at a pressure sufficient to fracture the formation, where the slick water fracturing composition includes a partially hydrolyzed polyacrylamide polymer system within an inverted emulsion and an effective amount of a friction reducer booster system comprising one quaternary salts or a plurality of quaternary salts, where the effective amount is sufficient to reduce a drag friction of the composition by an additional amount of at least 5% in the first 30 seconds of evaluation in high salinity and low temperature environments compared to a composition in the absence of the friction reducer booster system.

2. The method of claim 1, wherein the friction reducer booster system comprises: (1) compounds of the general formula $R^1R^2R^3ArN^+X^-$, where $R^1$ and $R^2$ are carbyl group including 1 to 3 carbon atoms, $R^3$ is a carbyl group including about 8 to about 20 carbon atoms, Ar is an aryl group and $X^-$ is a counterion, (2) compounds of the general formula $R^1R^2R^3R^4N^+X^-$, where $R^1$ and $R^2$ are carbyl group including 1 to 3 carbon atoms, $R^3$ and $R^4$ are a carbyl group including about 6 to about 10 carbon atoms, and $X^-$ is a counterion or (3) mixtures and combinations thereof, where $X^-$ includes chloride (Cl$^-$), bromide (Br$^-$), hydroxide (OH$^-$), or mixtures thereof.

3. The method of claim 1, wherein the friction reducer booster system comprises: (1) compounds of the general formula $R^1R^2R^3ArN+X^-$, where $R^1$ and $R^2$ are carbyl group including 1to 2 carbon atoms, $R^3$ is a carbyl group including about 10 to about 18 carbon atoms, Ar is an aryl group and $X^-$ is a chloride, (2) compounds of the general formula $R^1R^2R^3R^4N+X^-$, where $R^1$ and $R^2$ are carbyl group including 1 to 2 carbon atoms, $R^3$ and $R^4$ are a carbyl group including about 7 to about 9 carbon atoms, and $X^-$ is a chloride, or (3) mixtures and combinations thereof.

4. The method of claim 1, wherein the friction reducer booster system comprises: (1) compounds of the general formula $R^1R^2R^3ArN+X^-$, where $R^1$ and $R^2$ are carbyl group including 1carbon atom, $R^3$ is a carbyl group including about 12 to about 16 carbon atoms, Ar is an aryl group and $X^-$ is a chloride, (2) compounds of the general formula $R^1R^2R^3R^4N+X^-$, where $R^1$ and $R^2$ are carbyl groups including 1 carbon atom, $R^3$ and $R^4$ are a carbyl group including 8 carbon atoms, and $X^-$ is a chloride, or (3) mixtures and combinations thereof.

5. The method of claim 3, wherein the compound of the general formula $R^1R^2R^3ArN+X^-$ comprises alkyl (C12-16), dimethylbenzylammonium chloride.

6. The method of claim 3, wherein the compound of the general formula $R^1R^2R^3R^4N+X^-$ comprises 1-Octaminium, N,N-Dimethyl-N-Octyl-Chloride.

7. The method of claim 3, wherein the compound of the general formula $R^1R^2R^3ArN+X^-$ comprises alkyl (C12-16), dimethylbenzylammonium chloride and the compound of the general formula $R^1R^2R^3R^4N+X^-$ comprises 1-Octaminium, N,N-Dimetyl-N-Octyl-Chloride.

8. The method of claim 1, wherein the partially hydrolyzed polyacrylamide polymers comprise polyacrylamide polymers having a molecular weight between about 1 million and about 50million and being partially hydrolyzed, where the degree of hydrolysis is between about 1% to about 50%.

9. The method of claim 1, wherein the partially hydrolyzed polyacrylamide polymers comprise polymers having a molecular weight between about 5 million and about 40 million and being partially hydrolyzed, where the degree of hydrolysis is between about 1% to about 50%.

10. The method of claim 1, wherein the partially hydrolyzed polyacrylamide polymers include, without limitation, polyacrylamide polymers having a molecular weight between about 10 million and about 30 million and being partially hydrolyzed, where the degree of hydrolysis is between about 1% to about 50%.

11. The method of claim 1, wherein the partially hydrolyzed polyacrylamide polymers include, without limitation, polyacrylamide polymers having a molecular weight between about 20 million and about 30 million and being partially hydrolyzed, where the degree of hydrolysis is between about 1% to about 50%.

12. The method of claim 1, wherein the effective amount is sufficient to reduce the drag friction of the composition by an additional amount of at least 10% in the first 30 seconds of evaluation in high salinity and low temperature environments compared to a composition in the absence of the friction reducer booster system.

13. The method of claim 1, wherein the effective amount is sufficient to reduce the drag friction of the composition by an additional amount of at least 12% in the first 30 seconds of evaluation in high salinity and low temperature environments compared to a composition in the absence of the friction reducer booster system.

14. A slick water fracturing composition comprising from about 0.01 to about 2.5 gpt of an inverted emulsion including between about 25 wt. % and about 35 wt. % of a partially hydrolyzed polyacrylamide polymer system and an effective amount of a friction reducing booster system comprising one quaternary salts or a plurality of quaternary salts, where the effective amount is sufficient to reduce a drag friction of the composition by an additional of at least 5% in the first 30 seconds of evaluation in high salinity aqueous solutions and/or temperature environments compared to the tests in the absence of the friction reducer booster system.

15. The composition of claim 14, wherein the friction reducer booster system comprises: (1) compounds of the general formula $R^1R^2R^3ArN+X^-$, where $R^1$ and $R^2$ are carbyl group including 1 to 3 carbon atoms, $R^3$ is a carbyl group including about 8 to about 20 carbon atoms, Ar is an aryl group and $X^-$ is a counterion, (2) compounds of the general formula $R^1R^2R^3R^4N+X^-$, where $R^1$ and $R^2$ are carbyl group including 1 to 3 carbon atoms, $R^3$ and $R^4$ are a carbyl group including about 6 to about 10 carbon atoms, and $X^-$ is a counterion or (3) mixtures and combinations thereof, where $X^-$ includes chloride (Cl$^-$), bromide (Br$^-$), hydroxide (OH$^-$), or mixtures thereof.

16. The composition of claim 14, wherein the friction reducer booster system comprises: (1) compounds of the general formula $R^1R^2R^3ArN^+X^-$, where $R^1$ and $R^2$ are carbyl group including 1 to 2 carbon atoms, $R^3$ is a carbyl group including about 10 to about 18 carbon atoms, Ar is an aryl group and $X^-$ is a chloride, (2) compounds of the general formula $R^1R^2R^3R^4N^+X^-$, where $R^1$ and $R^2$ are carbyl group including 1 to 2 carbon atoms, $R^3$ and $R^4$ are a carbyl group including about 7 to about 9 carbon atoms, and $X^-$ is a chloride, or (3) mixtures and combinations thereof.

17. The composition of claim 14, wherein the friction reducer booster system comprises: (1) compounds of the general formula $R^1R^2R^3ArN^+X^-$, where $R^1$ and $R^2$ are carbyl group including 1carbon atom, $R^3$ is a carbyl group including about 12 to about 16 carbon atoms, Ar is an aryl group and $X^-$ is a chloride, (2) compounds of the general formula $R^1R^2R^3R^4N^+X^-$, where $R^1$ and $R^2$ are carbyl groups including 1 carbon atom, $R^3$ and $R^4$ are a carbyl group including 8 carbon atoms, and $X^-$ is a chloride, or (3) mixtures and combinations thereof.

18. The composition of claim 17, wherein the compound of the general formula $R^1R^2R^3ArN+X^-$ comprises alkyl (C12-16),dimethylbenzylammonium chloride.

19. The composition of claim 17, wherein the compound of the general formula $R^1R^2R^3R^4N+X^-$ comprises 1-octaminium, N,N-dimetyl-N-octyl-chloride.

20. The composition of claim 17, wherein the compound of the general formula $R^1R^2R^3ArN+X^-$ comprises alkyl (C12-16),dimethylbenzylammonium chloride and the compound of the general formula $R^1R^2R^3R^4N+X^-$ comprises 1-octaminium, N,N-dimetyl-N-octyl-chloride.

21. The composition of claim 14, wherein the partially hydrolyzed polyacrylamide polymers comprise polyacrylamide polymers having a molecular weight between about 1 million and about 50 million and being partially hydrolyzed, where the degree of hydrolysis is between about 1% to about 50%.

22. The composition of claim 14, wherein the partially hydrolyzed polyacrylamide polymers comprise polymers having a molecular weight between about 5 million and about 40 million and being partially hydrolyzed, where the degree of hydrolysis is between about 1% to about 50%.

23. The composition of claim 14, wherein the partially hydrolyzed polyacrylamide polymers include, without limitation, polyacrylamide polymers having a molecular weight between about 10million and about 30 million and being partially hydrolyzed, where the degree of hydrolysis is between about 1% to about 50%.

24. The composition of claim 14, wherein the partially hydrolyzed polyacrylamide polymers include, without limitation, polyacrylamide polymers having a molecular weight between about 20million and about 30 million and being partially hydrolyzed, where the degree of hydrolysis is between about 1% to about 50%.

25. The composition of claim 14, wherein the effective amount is sufficient to reduce a drag friction of the composition by an additional of at least 12% in the first 30 seconds of evaluation in an aqueous solution with salinity higher than 100,000 ppm and/or temperature as low as 32° F. compared to the tests in the absence of the friction reducer booster system.

26. The composition of claim 14, wherein the effective amount is sufficient to reduce the drag friction of the composition by an additional amount of at least 10% in the first 30 seconds of evaluation in high salinity and low temperature environments compared to a composition in the absence of the friction reducer booster system.

27. The composition of claim 14, wherein the effective amount is sufficient to reduce the drag friction of the composition by an additional amount of at least 12% in the first 30 seconds of evaluation in high salinity and low temperature environments compared to a composition in the absence of the friction reducer booster system.

* * * * *